United States Patent
Ma et al.

[11] Patent Number: 5,534,302
[45] Date of Patent: Jul. 9, 1996

[54] METHOD OF PREPARING A FIBER REINFORCED MODIFIED PHENOLIC RESIN COMPOSITE

[75] Inventors: Chen-Chi M. Ma; Hew-Der Wu; Ming-Shiu Li, all of Hsinchu, Taiwan

[73] Assignee: National Science Council, Taipei, Taiwan

[21] Appl. No.: 368,886

[22] Filed: Jan. 5, 1995

[51] Int. Cl.$^6$ .................................................. B05D 3/02
[52] U.S. Cl. .................... 427/379; 427/385.5; 427/388.3; 427/389.8; 427/393.5; 525/398; 525/456
[58] Field of Search .................................. 427/379, 385.5, 427/389.7, 389.8, 393.5, 388.2, 388.3; 428/375, 378, 379, 392, 394, 395; 525/395, 399, 456, 480, 504

[56] References Cited

U.S. PATENT DOCUMENTS

| | | | |
|---|---|---|---|
| 3,973,071 | 8/1976 | Fahey | 427/389.7 |
| 4,919,739 | 4/1990 | Dyksterhouse et al. | 427/195 X |
| 5,176,865 | 1/1993 | Beall et al. | 427/434.6 X |

*Primary Examiner*—Michael Lusignan
*Attorney, Agent, or Firm*—Hitt Chwang & Gaines

[57] ABSTRACT

A method for the preparation of a fiber reinforced modified phenolic resin composite, which comprises preparing a resole type phenolic resin having 60–75 wt % solid content and 5–10 wt % free aldehyde; preparing a blocked polyurethane resin having an average molecular weight of 2000–8000 and a viscosity of 500–1000 cps at 80° C.; mixing the resole type phenolic resin, the blocked polyurethane resin and an acid catalyst at room temperature to form an impregnating resin, wherein the amount of the acid catalyst mixed is 2–10 wt %, based on the weight of the resole type phenolic resin, and the amount of the blocked polyurethane mixed is 5–20 wt %, based on the total weight of the mixed resins; and impregnating a plurality of filaments with the impregnating resin, and curing the impregnated filaments with a heat treatment to form a fiber reinforced modified phenolic resin composite.

13 Claims, 2 Drawing Sheets

METHOD OF PREPARING A FIBER REINFORCED MODIFIED PHENOLIC RESIN COMPOSITE

FIELD OF THE INVENTION

The present invention is related to a fiber reinforced phenolic resin composite, in particular to a fiber reinforced phenolic resin composite wherein said phenolic resin is modified by blocked polyurethane.

BACKGROUND OF THE INVENTION

Conventional resins used in a pultrusion process for making a fiber reinforced resin composite are thermoset resins, such as unsaturated polyester resin and epoxy resins. Phenolic resin which is known to have excellent mechanical properties and electrical properties, especially at elevated temperatures, has been used to produce fiber reinforced products by prepreging, compounding, reaction injection molding or pultrusion processes, but phenolic resin used as a binder in the fabrication of a fiber reinforced composite product so far is still not so popular compared to the others due to its brittle nature which causes its poor coupling with fiber, its slow curing rate, and due to the side product (water) which may be generated causing void defects. Therefore there is a need in the composite industry to improve the quality and properties of a pultruded fiber reinforced phenolic based resin composite.

Several methods have been developed to toughen phenolic resin. For examples, U.S. Pat. No. 2,267,390 uses China wood oil (tung oil), Japanese Patent No. 29-7595 uses rosin, and U.S. Pat. No 2,675,335 uses alkyl phenol for toughening phenolic resin. However, these methods all require the modifying agents to react with phenolic resin for a period of time in order to obtain the desired toughening effect.

At present meta-hydroxyl phenol catalyst is used to shorten the gel time of phenolic resin so that it can be used in manufacturing a fiber reinforced composite product; however, the addition of meta-hydroxyl phenol catalyst also decreases the storage stability of phenolic resin and pot life of phenolic resin.

It is known that the coupling between phenolic resin and the surface of a common fiber is poor, and filaments having a special surface treatment are necessary for the fabrication of a fiber reinforced phenolic resin, e.g. filaments having a special surface treatment by isocyanate based coupling agent are available from the fiber glass manufacturers, e.g. Clark-Schwebel Fiberglass Corp., U.S., etc. These special treated filaments result in more stocks and production costs, and an additional operation procedure of changing different filaments.

To our knowledge there is no method in the art which can toughen phenolic resin, increase the curing rate of phenolic resin without adversely affecting the storage stability thereof, and enhance tile coupling between phenolic resin and fiber at the same time.

The present inventors are the first ones who use phenolic resin modified by blocked polyurethane to prepare fiber/resin composites. The blocked polyurethane can enhance the toughness, the mechanical properties of the fiber/resin composite, and the curing rate of the modified phenolic resin without adversely affecting the storage stability thereof. Moreover, the filaments having a special surface treatment are no longer needed in the preparation of a fiber reinforced phenolic resin composite by using the modified phenolic resin because a good coupling between the modified phenolic resin and regular filaments can be obtained.

SUMMARY OF THE INVENTION

The primary objective of the present invention is to provide a method of preparing a fiber reinforced modified phenolic resin composite, wherein the fiber used does not require a special surface treatment, and the composite prepared still has a good coupling between the resin and fiber, a low void percentage and improved mechanical properties.

In order to achieve the objective a method for the preparation of a fiber reinforced modified phenolic resin composite accomplished in accordance with the present invention comprises the following steps:

a) preparing a resole type phenolic resin having 60–75 wt % solid content and 5–10 wt % free aldehyde;

b) preparing a blocked polyurethane resin having a viscosity of 500–1000 cps at 80° C.;

c) mixing the resole type phenolic resin, the blocked polyurethane resin and an acid catalyst at room temperature to form an impregnating resin, wherein the amount of the acid catalyst mixed is 2–10 wt %, based on the weight of the resole type phenolic resin, and the amount of the blocked polyurethane mixed is 5–20 wt %, based on the total weight of the mixed resins; and d) impregnating a plurality of filaments with the impregnating resin, and curing the impregnated filaments with a heat treatment to form a fiber reinforced modified phenolic resin composite.

DETAILED DESCRIPTION OF THE INVENTION

Figure 1:
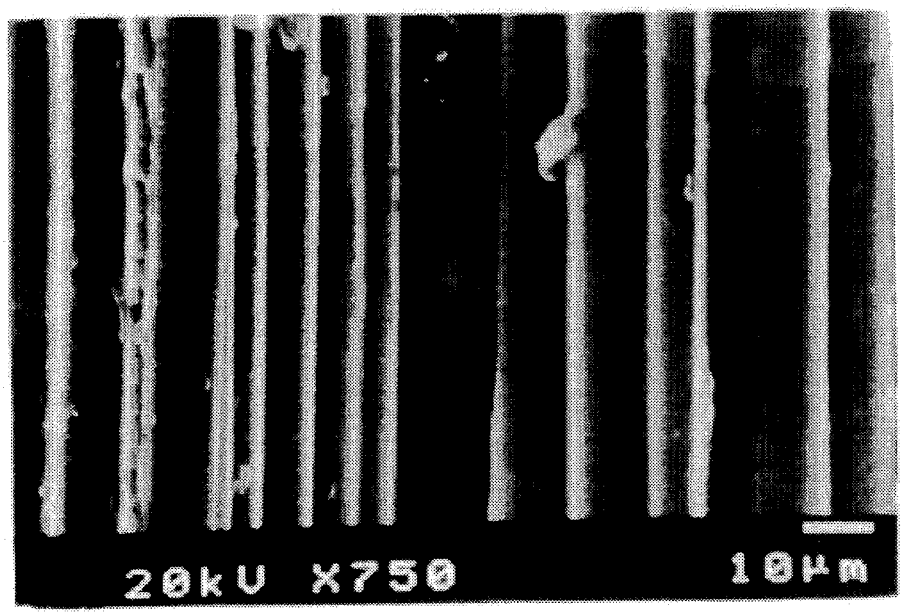
FIG. 1 is a scanning electron microscope (SEM) photograph which shows the coupling between an un-modified phenolic resin and glass fiber.

The present invention discloses a blocked polyurethane modified phenolic resin, which is suitable for preparing a fiber/resin composite product. The modified phenolic resin is prepared by mixing a blocked polyurethane with a resole type phenolic resin to form a prepolymer for impregnating fiber.

A suitable resole type phenolic resin for use in the present invention contains 60–75 wt % of solid content and 5–10 wt % of free aldehyde content. A suitable process for preparing this resole type phenolic resin is by carrying out a condensation reaction of an excess amount of formaldehyde or the like and phenol in the presence of an alkaline catalyst. This process is well known in the art, such as the process described in U.S. Pat. No. 4,419,400, the disclosure of which is incorporated herein by reference. The block polyurethane modified phenolic resin of the present invention is prepared by mixing the resultant resole type phenolic resin with an appropriate amount of a blocked polyurethane and an appropriate amount of an acid catalyst. The fresh blocked polyurethane modified phenolic resin has a viscosity ranging from 800 cps to 2,000 cps at 30° C., the viscosity is measured according to the method of ASTM D2393 with a Brookfield type viscometer.

The acid catalyst, also known as curing agent, is well known in the art, including the organic acid catalyst disclosed in U.K. patent 1,363,277, details thereof are incorporated by reference. A preferred catalyst is selected from the group consisting of p-toluenesulfonic acid, phenolsulfonic acid, and phosphoric acid. The amount of said acid catalyst used ranges from 2 to 10 wt % based on the weight of the resole type phenolic resin, and preferably is about 5 wt %.

The amount of said blocked polyurethane mixed with the resole type phenolic resin ranges from 5 to 20 wt % based on the total weight of blocked polyurethane and resole type phenolic resin. The blocked polyurethane used in the present invention is a NCO-terminated polyurethane prepolymer with its —NCO functional groups being blocked by additional compounds bonded thereto so that an active hydrogen-containing compound such as water can not react with the blocked polyurethane at room temperature. However, at an elevated temperature such as 150° C. or higher the bonded additional compounds are released from the —NCO functional groups which causes the blocked polyurethane changes back to the NCO-terminated polyurethane prepolymer. Therefore, the blocked polyurethane modified phenolic resin of the present invention will react with the hydroxyl groups of the resole type phenolic resin at an elevated temperature for example 150° C. or higher to form a grafting or cross-linking matrix. In addition, the —NCO groups of the polyurethane prepolymer are also reactive with the hydroxyl groups of glass fiber, i.e. it functions as an coupling agent between the resole type phenolic resin and the glass fiber. It can be understood from above that the blocked polyurethane has two functions: one is toughening the phenolic resin, and the other is enhancing the coupling between the resole type phenolic resin and the glass fiber. A suitable blocked polyurethane for use in the present invention has a viscosity ranging from 500 to 1,000 cps at 80° C., which can be prepared by reacting an excess amount of polyisocyanate with polyether type or polyester type polyol to form a NCO-terminated polyurethane prepolymer, and then reacting the resulting prepolymer with monohydroxyl-containing phenolic compounds. The preparation of this blocked polyurethane is well known in the art.

As it is well known in the art, mineral fillers such as talc, silica, and clay, etc. may be added into the liquid resin in order to improve the mechanical properties of the pultruded composites. The amount of said mineral fillers added is 1–15 wt % based on the weight of the liquid resin. In addition, a mold-release agent may also be added into the liquid resin.

As it is well known to those skilled in the art, in general, the viscosity of a liquid resin will first decrease when it is heated, then increase during the course of heating. In one of the, preferred embodiments, the initial viscosity of a blocked polyurethane modified phenolic resin containing 10 wt % of blocked polyurethane and 5 wt % of p-toluenesulfonic acid is 1,000 cps at 30° C., and it increases to 3,300 cps after a period of 8 hours, about 5,800 cps after a period of 12 hours, and about 8,400 cps after a period of 16 hours. This embodiment shows the blocked polyurethane modified phenolic resin has a pot life longer than 8 hours at room temperature. The pot life decreases to 4.5 hours when the operational temperature is raised to 50° C. For a blocked polyurethane modified phenolic resin containing 20 wt % of blocked polyurethane, the pot life at various operational temperatures is close to that of a blocked polyurethane modified phenolic resin containing 10 wt % of blocked polyurethane.

The reinforced fiber suitable for preparing a fiber/resin composite may be employed in various continuous or non-continuous forms such as strand, roving, woven roving, cloth, and mat. Various filamentary materials may be used in producing the composite of the invention such as glass, carbon, aromatic polyamides, ceramic, metal and hybrid thereof.

A suitable process for fabricating a composite of the invention includes (but not limited to) hand lay-up, spray up, filament winding, hot press, pultrusion, injection, sheet molding compound (SMC) and block molding compound (BMC). Each process has its own optimal operational parameters for fabricating a composite having desired properties at a desired production rate. However, the reactions involved in these processes are basically the same, and the side product, water, generated during the cross-linking of the present blocked polyurethane modified phenolic resin is significantly reduced and thus the void content in the composite of the invention is decreased.

The invention will be further illustrated by a pultrusion process in the following example. The following examples are only meant to illustrate the invention, but not to limit it.

EXAMPLE

I) Preparation of blocked polyurethane (blocked PU):

The blocked polyurethane (blocked PU) was prepared in accordance with the formula listed in the following Table 1.

TABLE 1

| Constituent | weight (gram) |
| --- | --- |
| Polyol[1] | 100 |
| Toluenediisocyanate[2] | 66.4 |
| Phenol[3] | 35.9 |

[1] The polyol is manufactured by Bayer GmBH, Germany, under a code of Desmophen 1100.
[2] The toluenediisocyanate (TDI) is a reagent grade compound and available from Japan Pure Chemicals Industrial Co. (Japan).
[3] The phenol is a reagent grade compound and available from Japan Pure Chemicals Industrial Co. (Japan).

66.4 g TDI was reacted with 100 g polyol (Desmophen 1100) under nitrogen purge at 80° C. for 2 hours. 35.9 g phenol was then added to the reaction mixture and a reaction was carried out at the same temperature for another 2 hours. The resulting blocked polyurethane has a viscosity of about 500 to 1,000 cps at 80° C. and about 10,000 to 50,000 cps at room temperature.

II) Preparation of the impregnating resin:

The impregnating resin was prepared in accordance with the formula listed in the following Table 2 by mixing the constituents thoroughly.

TABLE 2

| Constituent | weight (gram) |
| --- | --- |
| Resole type phenolic resin[1] | 100 |
| p-toluenesulfonic acid[2] | 5 |
| dipropylene glycol[3] | 5 |
| Blocked polyurethane[4] | 9–25 |

[1] The resole type phenolic resin is a commercial phenol-formaldehyde resole type resin having a solid content of 70–75 wt % and sold under a code of PF-750 from Chang Chun Plastics Co., Ltd., Taiwan.

TABLE 2-continued

| Constituent | weight (gram) |
|---|---|

[2] The p-toluenesulfonic acid is a reagent grade compound and available from Japan Pure Chemicals Industrial Co. (Japan).
[3] The dipropylene glycol is a reagent grade compound and available from Japan Pure Chemicals Industrial Co. (Japan).
[4] The blocked polyurethane is prepared above.

III) Pultrusion:

20 rovings of 764-NT-218 glass fiber (PPG Co., U.S.) were drawn into a bath of the impregnating resin prepared above which was maintained at 30° C. 764-NT-218 glass fiber has a specific gravity of 2.54, and a single strand of this fiber has a diameter of 13.1 μm and a tensile strength of $2.2 \times 10^5$ psi. The impregnated glass fiber rovings were passed through a squeeze orifice to remove excess resin and air and through a 82-cm long, 1.27-cm wide and 0.319-cm thick curing die. Two sets of individually controlled electrical plate heaters were installed on both top and bottom of the die, where the first and the second set of plate heaters have a temperature of 180° C. and 200° C. respectively. The pulling rate was fixed at 30 cm/min. The final pultruded composite product has a fiber content of 50 vol % and a specific gravity of 1.61.

IV) Test specimens of the pultruded composites:

The glass fiber reinforced modified phenolic resin composites pultruded according to the above-described process by modified phenolic resins containing different contents of blocked polyurethane were tested in accordance with the method of ASTM D3039, ASTM D790 and ASTM D256 to obtain their tensile strength, flexural strength/flexural modulus and notched Izod impact strength, respectively. The results are shown in Table 3.

The final pultruded composites were further subjected to a postcuring treatment at a temperature of 180° C. for a period of 30 minutes. The flexural strength, flexural modulus and the tensile strength of the postcured composites are also shown in Table 4. The mechanical properties of the glass fiber/modified phenolic resin composite are enhanced more than 10% in the case where 10 wt % of blocked polyurethane is contained in the modified phenolic resin.

TABLE 3

| | Control | Blocked PU modified phenolic resin | | | |
|---|---|---|---|---|---|
| Blocked PU content, wt % | 0 | 5 | 10 | 15 | 20 |
| Tensile strength, MPa | 522 | 625 | 580 | 514 | 508 |
| Flexural strength, MPa | 679 | 716 | 631 | 580 | 524 |
| Flexural modulus, GPa | 36.0 | 36.2 | 35.9 | 35.4 | 34.5 |
| Notched Izod impact strength, ft-lb/in | 32.2 | 42.7 | 41.4 | 34.0 | 31.0 |
| (KJ/m) | (1.72) | (2.28) | (2.21) | (1.81) | (1.65) |

TABLE 4

| | Control | Blocked PU modified phenolic resin | | | |
|---|---|---|---|---|---|
| Blocked PU content, wt % | 0 | 5 | 10 | 15 | 20 |
| Tensile strength, MPa | 673 | 767 | 730 | 688 | 655 |
| Flexural strength, MPa | 706 | 748 | 787 | 659 | 645 |
| Flexural modulus, GPa | 35.7 | 36.0 | 36.0 | 35.4 | 34.7 |

TABLE 4-continued

| | Control | Blocked PU modified phenolic resin | | | |
|---|---|---|---|---|---|
| Notched Izod impact strength, ft-lb/in | 36.7 | 46.6 | 43.9 | 37.9 | 35.0 |
| (KJ/m) | (1.96) | (2.49) | (2.34) | (2.02) | (1.87) |

The void contents in the final pultruded composites are also reduced in the cases where the blocked polyurethane contents are not zero as it can be seen in the following Table 5.

TABLE 5

| | Control | Blocked PU modified phenolic resin | | | |
|---|---|---|---|---|---|
| Blocked PU content, wt % | 0 | 5 | 10 | 15 | 20 |
| Void, vol % | 6.7 | 6.0 | 5.4 | 5.0 | 4.5 |
| Fiber content, vol % | 52.0 | 50.3 | 50.3 | 49.8 | 49.9 |
| Resin content, vol % | 41.3 | 43.7 | 44.3 | 45.2 | 45.6 |

The following Table 6 lists gel time and storage time of the unmodified and modified phenolic resin at various temperatures. It can be seen from the data in Table 6 that the gel time of the modified phenolic resins is shortened while the storage time thereof is not significantly affected by the addition of blocked polyurethane.

TABLE 6

| | Control | Blocked PU modified phenolic resin | |
|---|---|---|---|
| Blocked PU content, wt % | 0 | 10 | 20 |
| Gel time, second | | | |
| 160° C. | 563 | 507 | 467 |
| 180° C. | 138 | 128 | 112 |
| 200° C. | 28 | 26 | 25 |
| Storage time, hour | | | |
| 30° C. | 8.0 | 8.3 | 7.8 |
| 50° C. | 4.6 | 4.5 | 4.3 |

The following Table 7 lists the results of fire retardant tests run for the final pultruded composites. It can be seen from Table 7 that the fire retardant properties of the final pultruded composites are not significantly affected by the addition of blocked polyurethane, and the final pultruded composite manufactured by the modified phenolic resin containing 10 wt % blocked polyurethane still meets the UL-94 V-0 grade.

TABLE 7

| | Control | Blocked PU modified phenolic resin | | | |
|---|---|---|---|---|---|
| Blocked PU content, wt % | 0 | 5 | 10 | 15 | 20 |
| UL-94 | V-0 | V-0 | V-0 | V-1 | V-1 |
| Oxygen Index | 55 | 53 | 49 | 42 | 36 |

Figure 2:
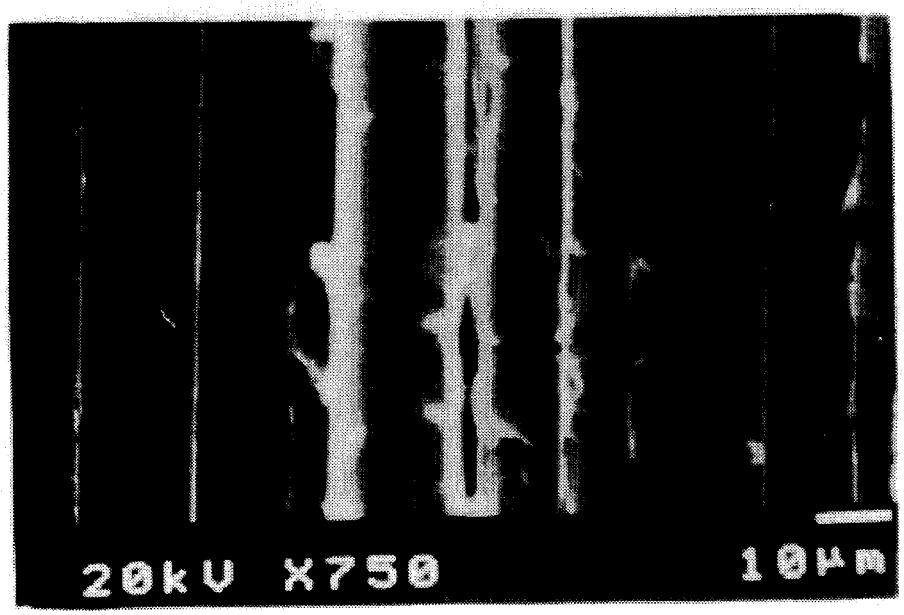
FIG. 2 is a scanning electron microscope (SEM) photograph which shows the coupling between glass fiber and a phenolic resin modified by blocked polyurethane (10 wt %).
Figure 3:
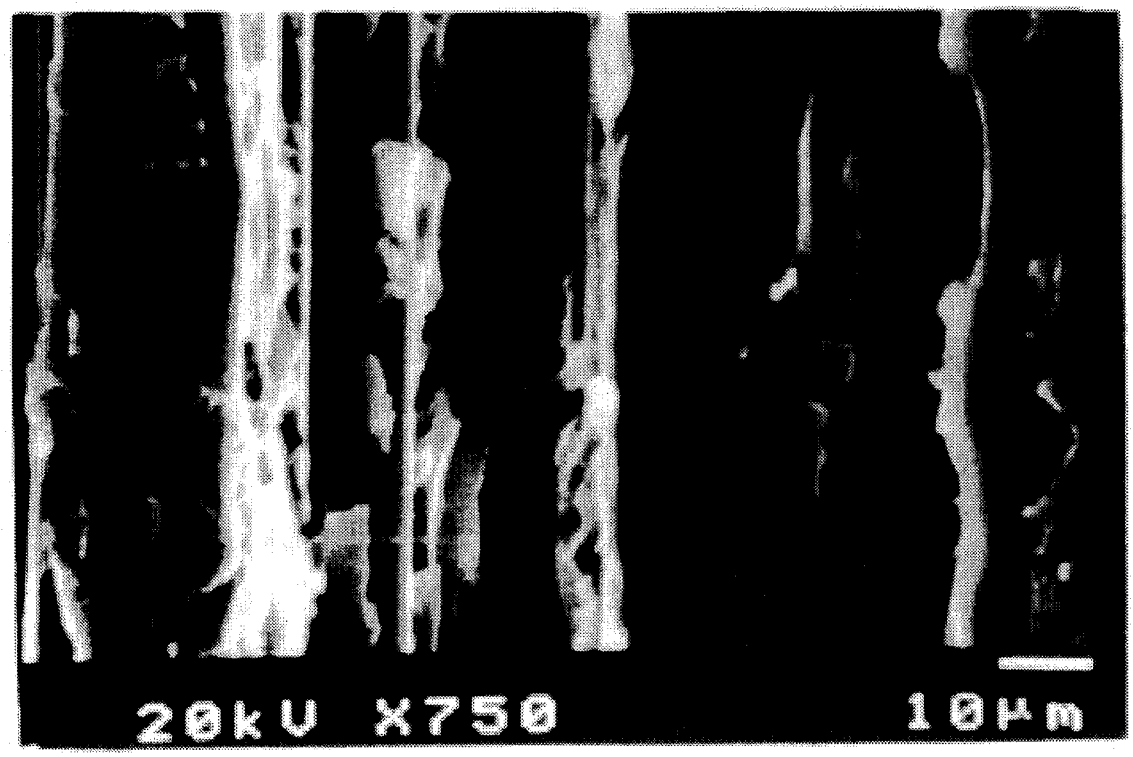
FIG. 3 is a scanning electron microscope (SEM) photograph which shows the coupling between glass fiber and a phenolic resin modified by blocked polyurethane (20 wt %).

FIGS. 1 to 3 are scanning electron microscope photographs of the final pultruded composites fabricated by un-modified phenolic resin, modified phenolic resin containing 10 wt % blocked polyurethane and modified phenolic resin containing 20 wt % blocked polyurethane respectively. As it is shown in FIG. 1 that the fiber exposed at the fracture has a smooth surface, the coupling between unmodified phenolic resin and glass fiber is poor. On the contrary, the fiber exposed at the fracture is adhered by resin as shown in FIG. 2 or 3, which indicates the glass fiber and the blocked polyurethane modified phenolic resin have a strong interfacial coupling force.

What is claimed is:

1. A method of preparing a fiber reinforced modified phenolic resin composite, which comprises the following steps:
   a) preparing a resole phenolic resin having 60–75 wt % solid content and 5–10 wt % free aldehyde;
   b) preparing a blocked polyurethane resin having an average molecular weight of 2000–8000 and a viscosity of 500–1000 cps at 80° C.;
   c) mixing the resole phenolic resin, the blocked polyurethane resin and an acid catalyst to form an impregnating resin, wherein the amount of the acid catalyst mixed is 2–10 wt %, based on the weight of the resole type phenolic resin, and the amount of the blocked polyurethane mixed is 5–20 wt %, based on the total weight of the mixed resins; and
   d) impregnating a plurality of filaments with the impregnating resin, and curing the impregnated filaments with a heat treatment to form a fiber reinforced modified phenolic resin composite.

2. The method according to claim 1, wherein the impregnating resin in step d) has a temperature ranging from room temperature to 60° C.

3. The method according to claim 1, wherein the heat treatment in step d) is carried out at a temperature ranging from 160° C. to 200° C. for a period of 1.5 to 3 minutes.

4. The method according to claim 1 wherein an additional postcuring treatment is employed to the fiber reinforced modified phenolic resin composite of step d).

5. The method according to claim 4 wherein the additional postcuring treatment is carried out at a temperature of about 160° C. for a period within two hours.

6. The method according to claim 4 wherein the additional postcuring treatment is carried out at a temperature of about 180° C. for a period within 30 minutes.

7. The method according to claim 4 wherein the additional postcuring treatment is carried out at a temperature of about 200° C. for a period within 10 minutes.

8. The method according to claim 1 wherein filaments are continuous or non-continuous filaments and in the form of strand, roving, woven roving, cloth, or mat.

9. The method according to claim 1, wherein the filaments are made of glass, carbon, aromatic polyamides, ceramic, metal or hybrid thereof.

10. The method according to claim 1, wherein the amount of the blocked polyurethane mixed is 10 wt % based on the total weight of the mixed resins.

11. The method according to claim 1, wherein the amount of the acid catalyst mixed is 5 wt % based on the weight of the resole phenolic resin.

12. The method according to claim 1, wherein the impregnating resin in step c) further contains a mineral filler and a mold-release agent.

13. The method according to claim 1, wherein said acid catalyst is selected from the group consisting of p-toluenesulfonic acid, phenolsulfonic acid and phosphoric acid.

* * * * *

UNITED STATES PATENT AND TRADEMARK OFFICE
CERTIFICATE OF CORRECTION

PATENT NO.   : 5,534,302
DATED        : July 9, 1996
INVENTOR(S)  : Ma et al.

It is certified that error appears in the above-indentified patent and that said Letters Patent is hereby corrected as shown below:

Col. 1, line 58, delete "tile" and insert therefore
-- the --.

Col. 3, line 56, delete "the, preferred" and insert therefore
-- the preferred --.

Signed and Sealed this

Twenty-fourth Day of September, 1996

Attest:

BRUCE LEHMAN

Attesting Officer        Commissioner of Patents and Trademarks